Dec. 5, 1961
W. H. C. STARK
3,011,707
TWIST MEASURING MEANS
Filed June 25, 1957
2 Sheets-Sheet 1
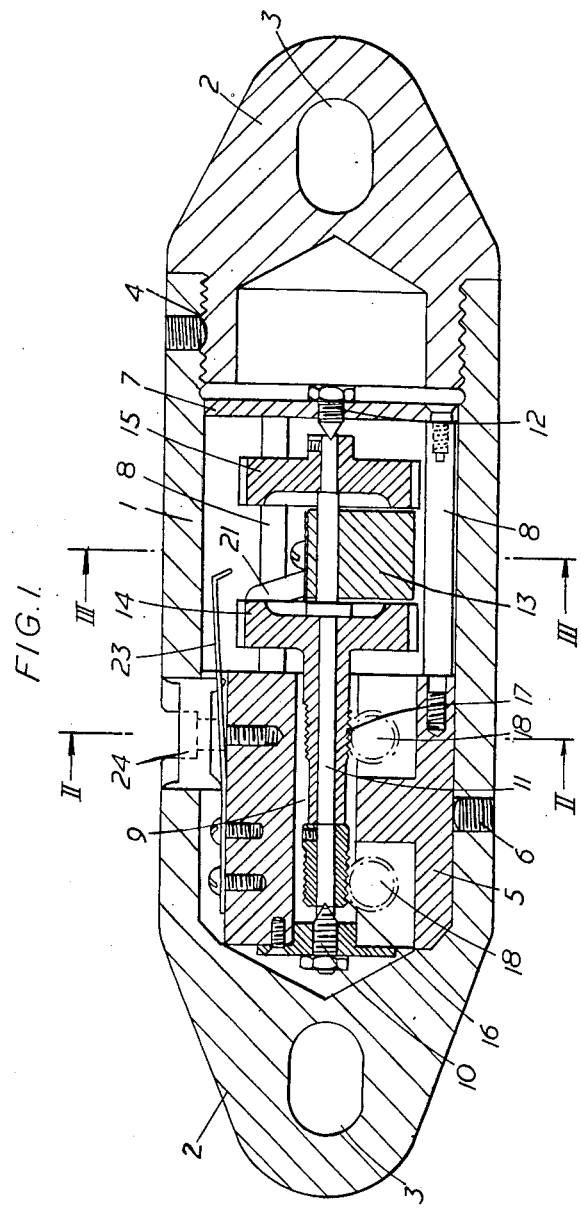
FIG.I.
Inventor
William Harry Charles Stark
By
Hooper, Leonard & Buell
his Attorneys

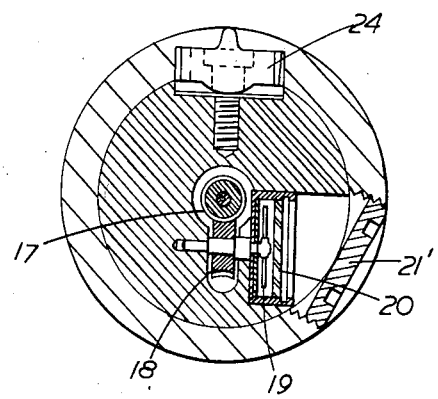
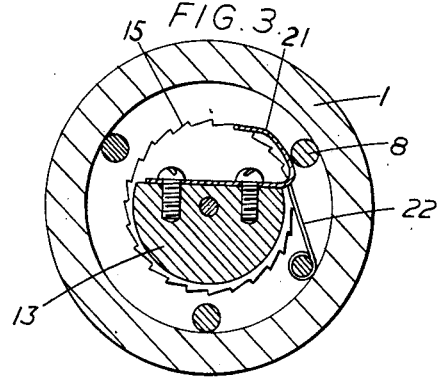
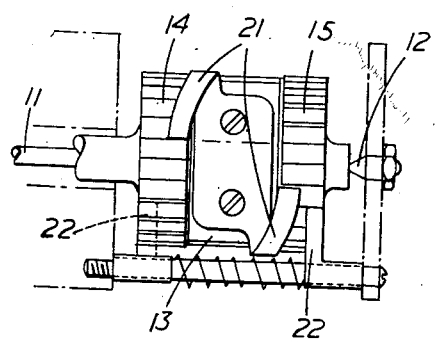

United States Patent Office 3,011,707
Patented Dec. 5, 1961

3,011,707
TWIST MEASURING MEANS
William Harry Charles Stark, Shenfield, England, assignor to Southern United Telephone Cables Limited, Essex, England, a British company
Filed June 25, 1957, Ser. No. 667,886
Claims priority, application Great Britain July 3, 1956
7 Claims. (Cl. 235—103)

During the process of pulling electric cables into ducts, pipes or the like the cables often become twisted. The object of the present invention is to provide apparatus for detecting the magnitude and direction of such twist.

With the aforesaid object in view we provide in accordance with the present invention a twist indicating device for insertion between the leading end of the cable to be pulled into the duct or pipe line or the like and the trailing end of the pulling rope. The device essentially comprises a tubular housing with means at its ends for its direct or indirect attachment to the cable and the pulling rope, a rotor within the housing, the housing and rotor being capable of rotation relative to and about an axis extending longitudinally within the housing but the rotor itself being gravity biased against rotation, and means for detecting and measuring the magnitude and direction of relative rotation between the housing and the gravity biased rotor.

The means for detecting and measuring the magnitude and direction of relative rotation between the housing and the gravity biased rotor may include a device responsive to relative rotation of the housing and its rotor in one direction but not in the other direction and a second device responsive to relative rotation of the housing and its rotor in the said other direction but not in the first said direction. Each of these devices may be a member driven in rotation relative to the housing by relative rotation between the housing and the rotor in one of two directions. Each of these driven members may drive one of two indicating devices, the arrangement being that one or other but not both of the indicating devices provides a measure of the relative rotation in one sense between the housing and its rotor, the device providing the measure serving to indicate the direction of relative rotation. Each driven member may be a wheel mounted for rotation about an axis coaxial with the axis of relative rotation between the housing and the rotor and integral with or coupled to one of a pair of engaging gears, the other gear of the pair planeting around the first gear as the housing rotates about a longitudinal axis and forming or driving an indicator indicating the number of revolutions made by the housing as the cable is being pulled.

An example of a twist indicating device constructed in accordance with the invention will now be described with reference to the acompanying drawings wherein:

FIGURE 1 is a sectional elevation of the device in accordance with the invention, FIGURE 2 is a cross-section of the device of FIGURE 1, taken along the line II—II thereof, FIGURE 3 is a cross-section of the device of FIGURE 1, taken along the line III—III thereof, and FIGURE 4 is a plan view of a portion of the mechanism of the twist indicating device shown in sectional elevation in FIGURE 1.

In this example of apparatus the housing consists of a tubular body 1 internally and externally of circular cross-section throughout the greater part of its length but having end walls 2 each shaped to form an eye 3 to receive a shackle for coupling it to a cable stocking or the like or to the pulling rope, as the case may be. This housing is divided into two parts which make a screw threaded connection 4 near one end of the housing. In the bore of the longer part is a cylindrical block 5 which is a sliding fit in the bore but is located, as by a grub screw 6 in the wall of the housing, at the inner end of the bore. At the outer end of the bore is a disc 7, also a sliding fit in the housing and connected to the block by three pillars 8 projecting from the outer end face of the block. These are positioned near the circumference of the end face. The block has a central axial passage 9 at the inner end of which is mounted a conical pivot 10 for rotatably supporting one end of a spindle 11 which extends beyond the passage and towards the disc where it is rotatably supported by a second conical pivot 12 mounted centrally on the disc. On this spindle is threaded a rotor consisting of a centrally apertured disc 13 from which a minor segment has been removed to create unbalance to impart gravity bias to the disc so that though it and the spindle are capable of relative rotation it tends to remain stationary as the housing rotates about its axis. On each side of this weight the spindle supports one of a pair of ratchet wheels 14 and 15 respectively. The ratchet wheel 15 at the outer end of the bore of the longer part of the housing is fixed to the spindle 11 and coupled through the spindle to a worm 16 fixed on the opposite end of the spindle. The other ratchet wheel 14, whose teeth are of opposite hand to those of the first ratchet wheel, has an elongated hub which extends to the worm and itself carries on a part within the block a second worm 17. This second ratchet and its worm are freely rotatable on the spindle. The construction of the indicating devices is shown more clearly in FIGURE 2 which shows the worm 17 and its associated parts. Each worm engages one of two worm wheels 18 housed in recesses in the block and carrying an indicating dial 19 housed in a recess in the circumference of the block, which recess is enclosed by a glass window 20. Opposite each window an opening is provided in the wall of the housing and a detachable cover plate 21' therefor. As may be seen by reference to FIGURES 3 and 4, on the flat surface of the pivotally suspended weight 13 are mounted a pair of oppositely directed spring pawls 21 for driving engagement with the two oppositely handed ratchet wheels 14 and 15 respectively. Also bearing upon each ratchet wheel is a spring pressed detent 22 to prevent idling rotation of the wheels.

The operation of the apparatus can be more readily appreciated by considering the housing to be stationary and the suspended weight to be rotating in one direction or the other upon the spindle instead of vice versa. Rotation of the weight in one direction will thus drive one ratchet wheel and its associated worm through the same angle and impart rotation to the worm wheel in engagement therewith while the other ratchet wheel remains stationary. Rotation of the weight in the reverse direction will drive the other ratchet wheel and its worm and so drive the second worm wheel. Thus if the two indicator discs are first zeroised before pulling begins, their positions after pulling will indicate the number of rotations made by the housing in each direction during the pulling operation, and the difference between the two indications will be a measure of the net twist in the pulled-in length of cable.

To prevent inadvertent operation of the device before pulling a releasable locking device for preventing or limiting relative rotation between the suspended weight and the housing may be fitted. This may comprise a leaf spring 23 of which the free end is normally clear of the path of relative movement between the housing and the suspended weight but which can be depressed so as to foul that path by means of a turn button 24 accessible from the outside of the housing.

What I claim as my invention is:

1. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longitudinally within said housing, means for gravity biasing said rotor against rotation, and means within said housing for detecting and measuring the magnitude and direction of relative rotation between said housing and said gravity biased rotor.

2. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longitudinally within said housing, means for gravity biasing said rotor against rotation, and means within said housing comprising a device responsive to relative rotation between said housing and said rotor in one direction only and a second device responsive to relative rotation between said housing and said rotor in the converse direction only, for detecting and measuring the magnitude and direction of relative rotation between said housing and said gravity biased rotor.

3. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longiutdinally within said housing, means for gravity biasing said rotor against rotation, a member and means for driving it in rotation relative to said housing at a speed proportional to the speed of relative rotation between said housing and said rotor in one direction only and a second member and means for driving it in rotation relative to said housing at a speed proportional to the speed of relative rotation between said housing and said rotor in the converse direction, means for detecting and measuring the magnitude and direction of relative rotation between said housing and said rotor the two driven members driving said means for detecting and measuring the magnitude and direction of relative rotation between said housing and said rotor.

4. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longitudinally within said housing, means for gravity biasing said rotor against rotation, a first indicating device for detecting and measuring the magnitude and direction of relative rotation between said housing and said rotor in one direction only, a member for driving said first indicating device and means for driving said member in rotation relative to said housing at a speed proportional to the speed of relative rotation between said housing and said rotor in said one direction, a second indicating device for detecting and measuring the magnitude and direction of relative rotation between said housing and said rotor in the converse direction, and a second member for driving said second indicating device and means for driving said second member in rotation relative to said housing at a speed proportional to the speed of relative rotation between said housing and said rotor in said converse direction.

5. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longitudinally within said housing, means for gravity biasing said rotor against rotation, a wheel and means for driving said wheel in rotation relative to said housing at a speed proportional to the speed of relative rotation between said housing and said rotor in one direction only and a second wheel and means for driving it in rotation relative to said housing at a speed proportional to the speed of relative rotation between said housing and said rotor in the converse direction, each of the two driven wheels being mounted for rotation about the said axis of relative rotation between said housing and said rotor, a first worm wheel in driving engagement with said first worm, a first indicator driven by said first worm wheel for indicating the number of revolutions made by said first worm, a second worm coupled to and coaxial with the other of said wheels, and a second worm wheel in driving engagement with said second worm, and a second indicator, driven by said second worm wheel, for indicating the number of revolutions made by said second worm.

6. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longitudinally within said housing, means for gravity biasing said rotor against rotation, a wheel and means for driving said wheel in rotation relative to said housing at a speed proportional to the speed of relative rotation between said housing and said rotor in one direction only and a second wheel and means for driving it in rotation relative to said housing at a speed proportional to the speed of relative rotation between said housing and said rotor in the converse direction, each of the two driven wheels being mounted for rotation about the said axis of relative rotation between said housing and said rotor, a first worm coupled to and coaxial with one of said wheels, a first worm wheel in driving engagement with said first worm, a first indicator driven by said first worm wheel for indicating the number of revolutions made by said first worm, a second worm coupled to and coaxial with the other of said wheels, and a second worm wheel in driving engagement with said second worm and a second indicator driven by said second worm wheel for indicating the number of revolutions made by said second worm.

7. A twist indicating device for insertion between the leading end of a cable to be pulled into a duct, pipe and the like and the trailing end of a pulling rope, comprising a tubular housing with means at its ends for its attachment to the cable and the pulling rope, a rotor mounted within said housing for rotation relative to and about an axis extending longitudinally within said housing and displaced from the center of gravity of said rotor to the extent that when the axis of the housing is substantially horizontal and the housing rotates about its axis the rotor tends to remain stationary with respect to the housing, and means within said housing for detecting and measuring the magnitude and direction of relative rotation between said housing and said rotor.

References Cited in the file of this patent

UNITED STATES PATENTS

| | | |
|---|---|---|
| 468,371 | Teate | Feb. 9, 1892 |
| 932,331 | Russell et al. | Aug. 24, 1909 |
| 1,052,714 | Durkee | Feb. 11, 1913 |
| 1,058,938 | Baumgaertner | Apr. 15, 1913 |
| 1,189,307 | Stokes et al. | July 4, 1916 |
| 2,037,274 | Scott | Apr. 14, 1936 |
| 2,279,563 | Dye | Apr. 14, 1942 |
| 2,468,334 | Kennedy | Apr. 26, 1949 |

FOREIGN PATENTS

| | | |
|---|---|---|
| 168,515 | Great Britain | Aug. 14, 1920 |